(12) United States Patent
Takaoka et al.

(10) Patent No.: US 6,836,814 B2
(45) Date of Patent: Dec. 28, 2004

(54) MOBILE COMMUNICATION TERMINAL DEVICE

(75) Inventors: Toshiaki Takaoka, Hino (JP); Kentoku Yamaguchi, Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 360 days.

(21) Appl. No.: 09/810,658

(22) Filed: Mar. 19, 2001

(65) Prior Publication Data

US 2001/0034807 A1 Oct. 25, 2001

(30) Foreign Application Priority Data

Apr. 25, 2000 (JP) .......................................... 2000-124493

(51) Int. Cl.[7] .............................................. G06F 13/00
(52) U.S. Cl. ........................................ 710/316; 710/303
(58) Field of Search ................................ 710/301, 303, 710/316, 100, 62; 455/557, 556.1, 572

(56) References Cited

U.S. PATENT DOCUMENTS 5,333,177 A    7/1994  Braitberg et al.
6,141,719 A  * 10/2000  Rafferty et al. ............. 710/316
6,516,205 B1 *  2/2003  Oguma ........................ 455/557

* cited by examiner

Primary Examiner—Khanh Dang
(74) Attorney, Agent, or Firm—Finnegan, Henderson, Farabow, Garrett & Dunner, L.L.P.

(57) ABSTRACT

According to the present invention, a serial control signal interface and a serial data interface are provided in addition to a USB interface having a USB device controller, and a switching circuit for selectively connecting these interface to a system connector is provided on a mobile communication terminal device. Then, when an external device is connected to the system connector, it is determined whether or not the external device has an external interface having a USB host function on the basis of the interface identification voltage supplied from the external device, so that the switching circuit is changed over on the basis of the determination result to select an appropriate interface.

26 Claims, 5 Drawing Sheets

ARRANGEMENT OF SYSTEM CONNECTOR PIN

| PIN NUMBER | NAME | SIGNAL TRANSMISSION DIRECTION | | REMARKS |
|---|---|---|---|---|
| | | MOBILE COMMUNICATION TERMINAL | EXTERNAL DEVICE | |
| P1 | GND(USBGND) | — | | CONFORMS TO USB STANDARD 1.1 |
| P2 | USB D+ | ⇔ | | CONFORMS TO USB STANDARD 1.1 |
| P3 | USB D− | ⇔ | | CONFORMS TO USB STANDARD 1.1 |
| P4 | USB VBUS | ← | | CONFORMS TO USB STANDARD 1.1 |
| P5 | CHARGING POWER SOURCE INPUT PIN | ← | | FOR USE IN CHARGING |
| P6 | CHARGING POWER SOURCE INPUT PIN | ← | | FOR USE IN CHARGING |
| P7 | SYNCHRONIZING CLOCK OUTPUT PIN | → | | FOR SYNCHRONIZING CLOCK OUTPUT |
| P8 | MAKER'S OPTION PIN | ⇔ | | FOR MAKER'S OPTION |
| P9 | RESERVATION PIN | NOT CONNECTED | | FOR RESERVATION |
| P10 | GND | — | | GRAND |
| PRF | RF TRX | ⇔ | | FOR COAXIAL (EXTERNAL ANTENNA) CONNECTION |

FIG. 2

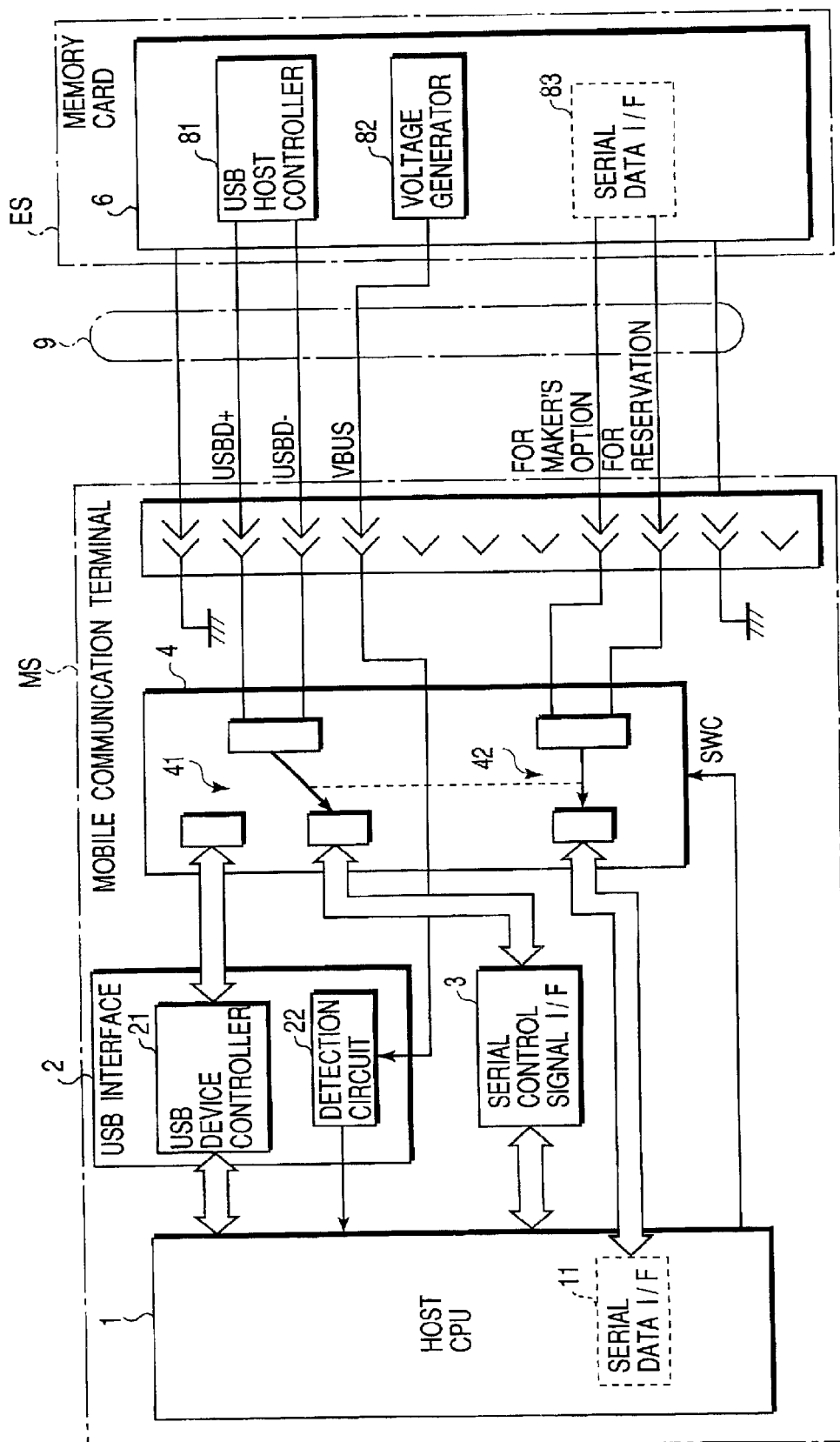
F I G. 5

MOBILE COMMUNICATION TERMINAL DEVICE

CROSS-REFERENCE TO RELATED APPLICATIONS

This application is based upon and claims the benefit of priority from the prior Japanese Patent Application No. 2000-124493, filed Apr. 25, 2000, the entire contents of which are incorporated herein by reference.

BACKGROUND OF THE INVENTION

1. Field of the Invention

The present invention relates to a mobile communication terminal device for use in a mobile communication system in which, for example, the CDMA (Code Division Multiple Access) scheme is adopted.

2. Description of the Related Art

As a scheme for realizing a next generation portable telephone system, the W-CDWM (Wideband Code Division Multiple Access) scheme and the cdma 2000 scheme are standardized and development is conducted on a various types of mobile telephone communication terminal devices used in this type of system.

For example, there is proposed that a connector attached with a USB (Universal Serial Bus) terminal is provided on a mobile terminal device. When the USB interface is used as an external connection interface, the mobile communication terminal can be simply connected to a personal computer. Furthermore, an external device such as a BT (Bluetooth) unit, a memory card, a keyboard or the like can be simply connected to the mobile communication terminal. Then, it becomes possible to appropriately expand a function of the mobile communication terminal by transmitting control data such as a telephone book or the like from the personal computer to the terminal of the mobile telephone to register the data in package and selectively using various external devices in accordance with the need thereof.

However, in the case where a signal is transmitted between a plurality of devices by using the USB interface, it is necessary to provide a USB host function on at least one of the devices. Such USB host function has a large processing load. Consequently, it is general that such USB host function is provided on a device having a high processing capability such as a personal computer or the like while a USB slave function is provided on peripherals such as a keyboard, a mouse or the like and small size devices such as a mobile communication terminal. In such structure, when an attempt is made to connect an external device such as BT (Bluetooth) unit, a memory card, a keyboard or the like to the mobile communication terminal, connection using the USB function cannot be realized because both have only the USB slave function.

In order to settle this problem, the USB host function may be provided on the mobile communication terminal. However, in such a structure, it is necessary to provide a large capacity memory and a CPU having a high processing capability on the mobile communication terminal, so that an increase in the consumption power and an increase in cost of the mobile communication terminal are invited.

On the other hand, it is thought that other universal interface such as a serial interface or the like is provided instead of providing the USB host function on the mobile communication terminal. In such a structure, it becomes unnecessary to provide a large capacity memory and a CPU having a high processing capability on the mobile communication terminal. However, apart from the connector having the USB terminal, it is necessary to provide a connector for a serial data interface, which constitutes a large hindrance in an attempt to decrease the size of the mobile communication terminal.

BRIEF SUMMARY OF THE INVENTION

An object of the present invention is to provide a mobile communication terminal device which allows a connection with an external device without providing a large capacity memory, a CPU having a high processing capability and a plurality of types of connectors, so that the consumption power is small, the cost is cheap and the reduction in size is small.

In order to attain the above object, a mobile communication terminal device according to a first aspect of the present invention comprises:

one external connector having a predetermined terminal arrangement structure;

a first external interface and a second external interface for sending and receiving a signal in accordance with mutually different protocols via the external connector between the mobile communication terminal device itself and the external connector;

a first determination function for determining a type of a third external interface incorporated in the external device connected to the external connector; and an interface selection function.

Then, with this interface selection function, an external interface corresponding to the third external interface incorporated in the external device is selected out of the first and the second interfaces on the basis of the determination result of the first determination function.

Consequently, according to the first aspect, a type of the third interface incorporated in the external device is determined every time the external device is connected thereto. On the basis of the determination result, a corresponding interface is selected out of the first and the second interfaces prepared in advance. Thus, even when the external device has any type of external interface, the device can be connected to the terminal of the mobile communication terminal itself.

In order to effectively realize the mobile communication device according to the first aspect of the present invention, still another device is made in the present application.

A first structure is such that a part of a group of external connector terminals is shared with the first external interface and the second external interface. With such a structure, it becomes unnecessary to provide a connector for each of the first interface and the second interface, so that the number of the external connector terminals can be decreased. Thus, the size of the mobile communication terminal can be decreased.

A second structure is such that when a plurality of types (and/or kinds) of external devices are connected to the external connector in the case where voltages output from the specific terminals are set to mutually different values in the plurality of types of external devices which are assumed to be connected, the voltage values output from the specific terminals are detected via a terminal corresponding to the external connector so that the type of the third external interface incorporated in the external device is determined on the detection result. With such structure, it is possible to determine the type of the third interface on the basis of the voltage value so that the determination is relatively simple.

A third structure is such that when a plurality of types of external devices are connected to the external connector with the first determination means in the case where patterns of identification signals output from the specific terminals thereof are set to mutually different patterns in the plurality of external devices which are assumed to be connected, the identification signal pattern output from the specific terminals is detected via a terminal corresponding to the external connector, so that the type of the third external interface is determined on the basis of the detection result. With such a structure, the type of the external device can be determined even when the output voltage value of the external device is the same.

A fourth structure is intended to display the determination result by the first determination function. With such a structure, the terminal user can clearly know which external interface is used at the time of the connection of the external device.

On the other hand, the mobile communication terminal device according to a second aspect of the present invention further comprises second determination function and a connection control function in addition to the constituent elements of the first aspect of the present invention. Then, with the second determination function, authentication procedure is conducted with the external device via the first and the second interfaces selected with the interface selection function to determine the connection form of the external device with the terminal of the mobile communication terminal device itself on the basis of the result of authentication. Then, on the basis of this determination, the connection of the external device with its own terminal is controlled with the connection control function.

Specifically, the type and the specification of the external device are detected through exchange of a signal between the external device and the communication terminal device itself via the first external interface and the second external interface selected with the interface selection function to determine whether or not the external deice can be connected to the terminal of the mobile communication terminal device itself on the basis of this detection result.

Consequently, according to the second aspect of the present invention, it is determined whether or not the external device can be connected to the terminal of the mobile communication terminal itself on the basis of, for example, the type and the specification of the external device. Consequently, in the case where the specifications or the like of the external device differ even when the external interface of the external device agrees with the mobile communication terminal device, the external device can be controlled so as not to be allowed to be connected so that highly reliable external device connection can be realized at all times.

In addition, the determination result by the second determination means may be displayed. With such a structure, the terminal user can confirm the connection form of the external device to his own terminal so that the terminal user can recognize that the external device cannot be connected, for example, when the external device cannot be actually connected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing a name and a function of each pin of a system connector provided on the mobile communication terminal shown in FIG. 1.

FIG. 5 is a view showing a connection structure in the case where a memory card without the USB host function is connected to the mobile communication terminal shown in FIG. 1 as the external device.

DETAILED DESCRIPTION OF THE INVENTION

Figure 1:
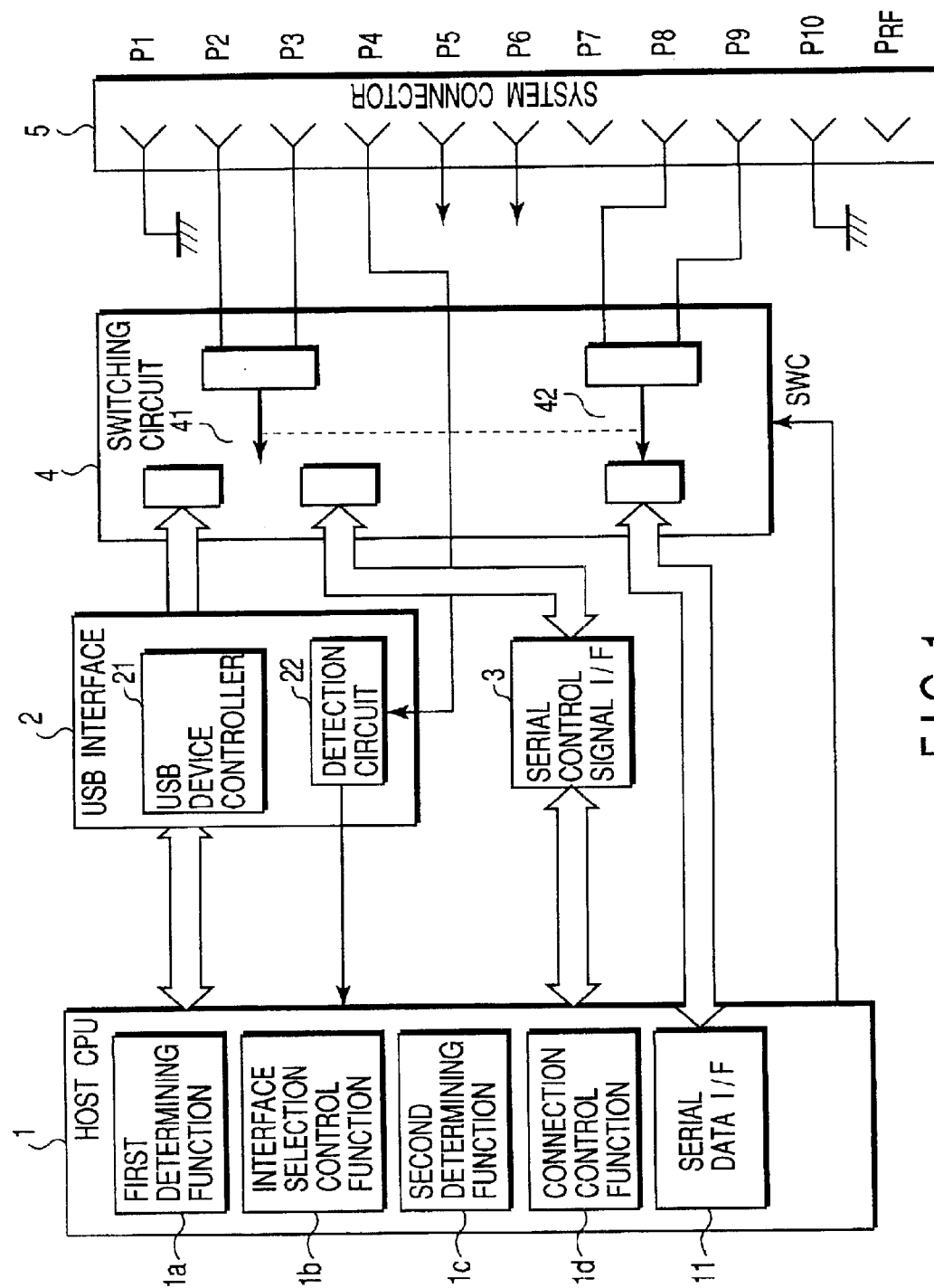
FIG. 1 is a view showing an essential portion of one embodiment of a mobile communication terminal according to the present invention.

Hereinafter, referring to the drawings, one embodiment of the present invention will be explained.

FIG. 1 is a view showing an essential portion of a mobile communication terminal corresponding to W-CDMA scheme which is one embodiment of a mobile communication terminal device according to the present invention. On the mobile communication terminal according to the embodiment, there are provided a host CPU 1, a USB interface 2, a serial control signal interface 3, a switching circuit 4 and a system connector 5 as constituent elements required for the connection with the external device.

Out of the constituent elements, in the beginning, the system connector 5 is provided for connecting the external device not shown to the terminal of the mobile communication terminal itself. The system connector 5 has a total of eleven terminals (pins) P1 through P10, and PRF. FIG. 2 is a view showing the name and the function of these pins P1 through P1 and PRF.

Out of eleven pints P1 through 10 and PRF, pins P1 through P4 are used for USB connection. Out of the pins, P2 and P3 are USB data transmission pin USBD+ and USBD−, so that data is transmitted in bi-directional manner between the mobile communication terminal and the external device not shown via these pins. Furthermore, P4 is a USB power source input pin, so that the USB power source voltage (4.75 through 5.25V) supplied from the external device is input. Incidentally, P1 is a USB grounding pin.

Besides, out of the eleven pins P1 through P10, PRF, pins P5 and P6 are power source input pins for charging to supply the charging voltage and current supplied from the charger which is one of the external device to a battery circuit not shown. The pin P7 is a synchronizing clock output pin to output a synchronizing clock (64 kHz) to the external device at the time of synchronizing communication with the external device. Incidentally, the electric condition of this synchronizing clock output pin P7 is CMOS2V±0.2V. When the pin P7 is not used, the pin P7 is set to a high impedance (200 kΩ or more).

Furthermore, pins P8 and P9 are manufacturer's option pin and a reservation pin, respectively. In this embodiment, by using these pins P8 and P9, serial data is transmitted between the mobile communication terminal and the external device. Incidentally, the electric condition of the manufacturer's option pin is defined so that the input voltage is set to be 3.6V or less. When the pin P8 is not used, the pin P8 is set to a high impedance (200 kΩ or more).

The USB interface 2 comprises a USB device controller 21, and a detection circuit 22. The USB device controller 21 has a slave function of the USB interface and transmits data via the USB data transmission pins P2 and P3 between the mobile communication terminal device and the external device such as a personal computer or the like having a USB host function.

The detection circuit 22 incorporates the interface identification voltage supplied from the external device via the USB power source input pin P4 of the system connector 5 to detect the voltage value. In this embodiment, the value of the interface identification voltage generated by the external device having no USB host function is set in advance to a value different from the USB power source voltage (4.75 through 5.25V) at which the external device having a USB function is generated. The detection circuit 22 detects these voltage values respectively to give the detection result to the host CPU 1.

The serial control signal interface 3 sends and receives the serial control signal at the time of transmitting the signal using the serial data interface between the external device and the mobile communication terminal device. In this embodiment, the serial control signal is transmitted via the USB data transmission pins P2 and P3 of the system connector 5.

The host CPU 1 is attached with a serial data interface 11. This serial data interface 11 sends and receives the serial data at the time of transmitting the signal using the serial data interface between the external device and the mobile communication terminal device. In this embodiment, this serial data is transmitted by using the manufacturer's option pin P8 and the reservation pin P9 of the system connector 5.

By the way, a switching circuit is provided between the USB interface 2 and the serial control signal interface 3, and the serial data interface 11 in the host CPU 11 and the system connector 5. The switching circuit 4 is attached with a first and a second change-over switch 41 and 42. The first and the second change-over switch 41 and 42 are associated with each other in accordance with the change-over control signal generated from the host CPU 1 to operate switching operation.

The first change-over switch 41 optionally changes over and connects the USB device controller 21 and the serial control signal interface 3 with respect to the USB data transmission pins P and P3 of the system connector 5. On the other hand, the second change-over switch 42 turn on and off the connection of the serial data interface 11 with respect to the manufacturer's option pin P8 and the reservation pin P9 of the system connector 5.

As a new function which is concerned with the present invention, the host CPU 1 comprises first determination function 1a, interface selection control function 1b, second determination function 1c and connection control function 1d.

Out of the functions, in the beginning, the first determination function 1a incorporates a detection value of the interface identification voltage from the detection circuit 22 of the USB interface 2 when the external device is connected to the system connector 5. Then, it is determined whether or not the external device which is connected has a USB host function on the basis of the detection value of the interface identification voltage.

The interface selection control function 1b gives the change-over control signal SWC to the switching circuit 4 on the basis of the determination result by the first determination function 1a. Then, in the case where it is determined that the external device has a USB host function, the USB device controller 21 is connected to the USB data transmission pins P2 and P3 with the first change-over switch 41. Besides, at the same time, the connection between the serial data interface 11, the manufacturer's option pin P8 and the reservation pin P9 is set to the OFF state with the second change-over switch 42.

On the other hand, in the case where it is determined that the external device does not have the USB host function, the serial control signal interface 3 is connected to the USB data transmission pins P2 and P3 with the first change-over switch 41. Furthermore, at the same time, the connection between the serial data interface 11, the manufacturer's option P8 and the reservation pin P9 is set to the ON state with the second change-over switch 42.

The second determination function 1c sends an ID request command to the external device via the USB device controller 21 or the serial control signal interface 3 in the state in which each of the interfaces 2, 3, 11 and the system connector 5 are selectively connected with the control of the interface selection control function 1b. Then, when the device ID and the manufacture ID are sent from the external device, the type of the external device and the specification thereof which is different from one manufacturer to another are determined on the basis of these device ID and the manufacturer ID.

The connection control function 1d determines on the basis of the determination result of the second determination means 1c whether or not the external device which is connected is a device which can be connected to the terminal of the mobile communication terminal device itself. Then, when the external device cannot be connected thereto, the connection between the system connector 5 and the main body of the terminal is electrically separated.

Figure 3:
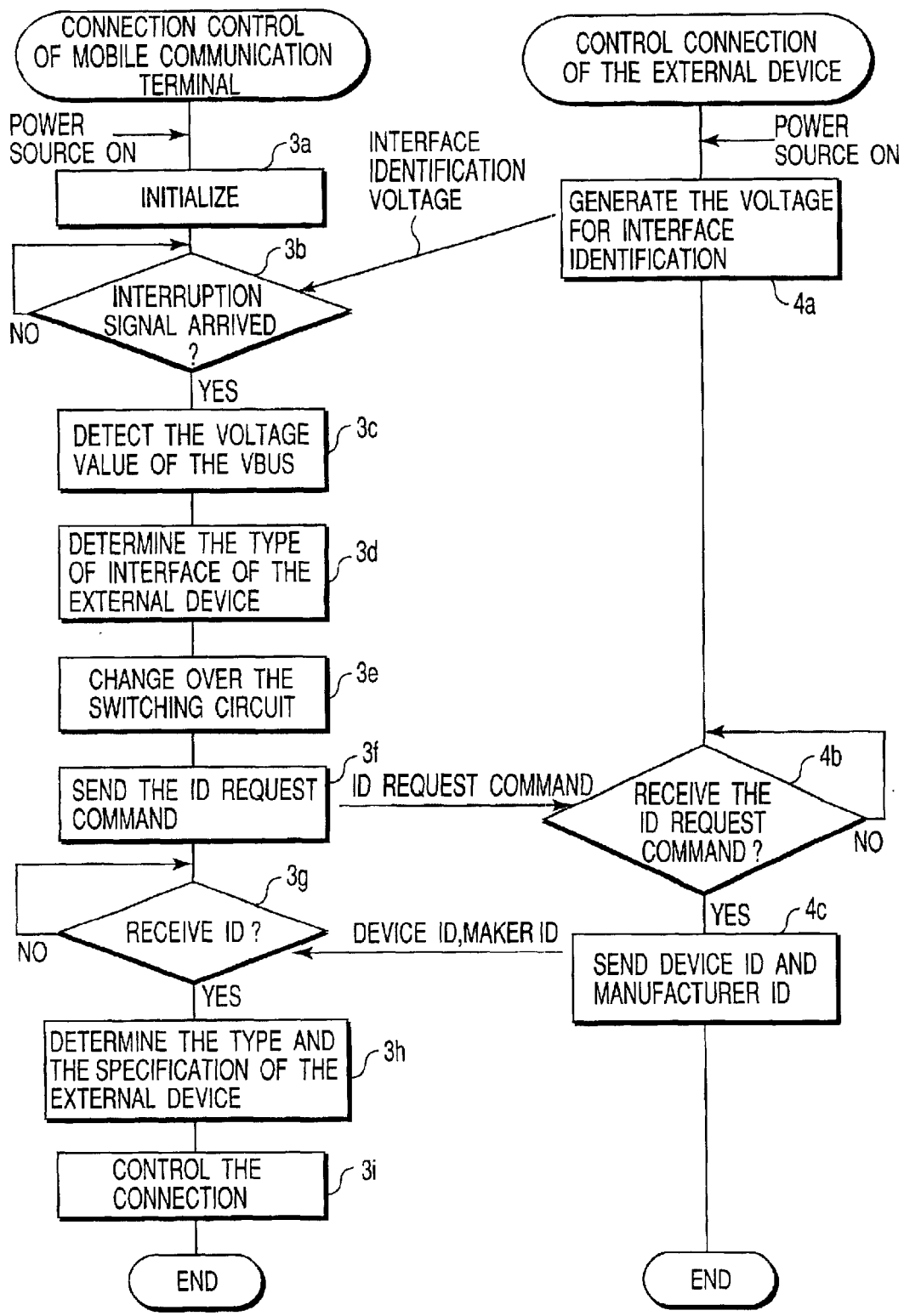
FIG. 3 is a flowchart showing a connection procedure of the mobile communication terminal shown in FIG. 1 and the external device connected to the mobile communication terminal and a content of the connection procedure.
Figure 4:
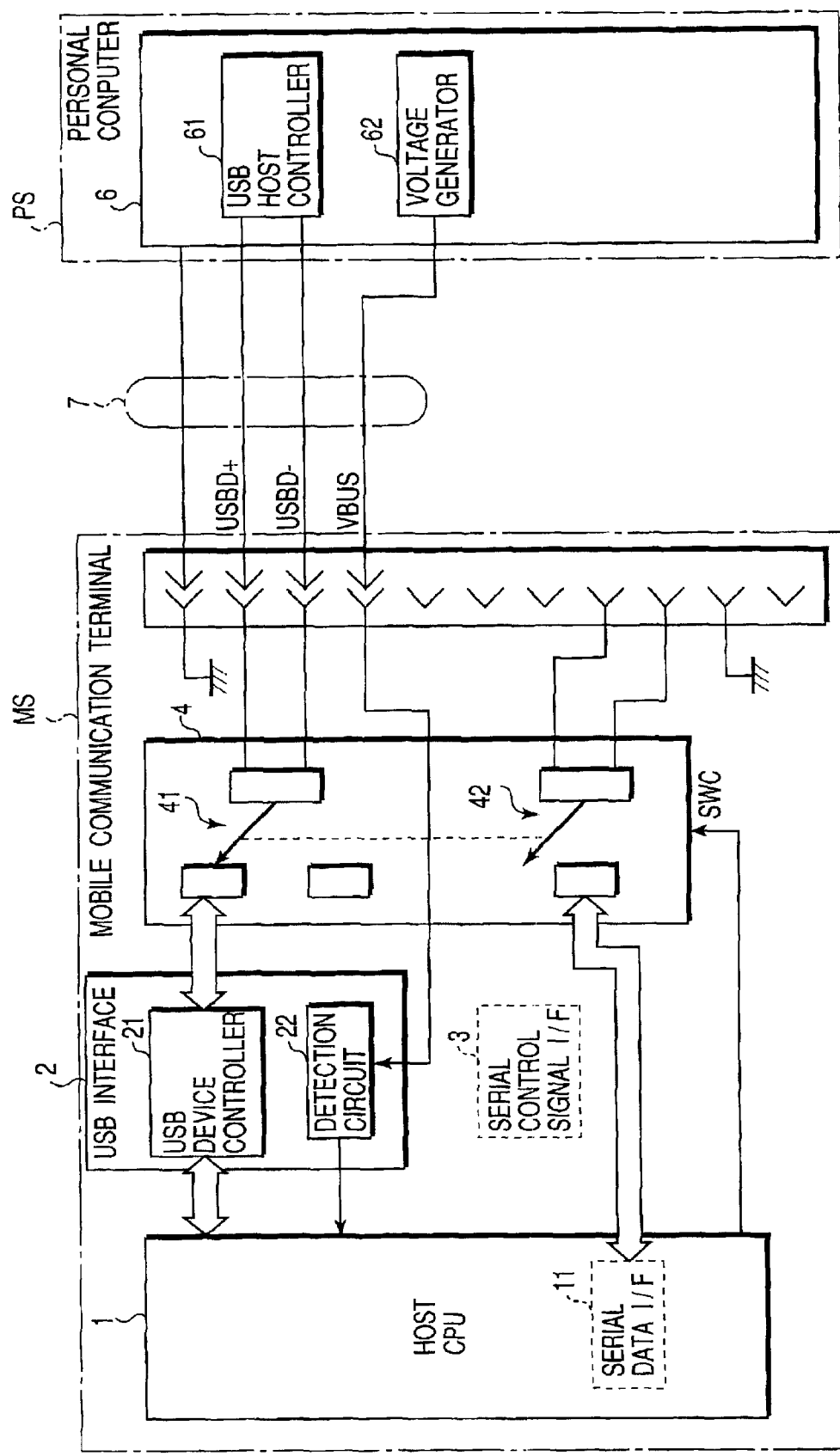
FIG. 4 is a view showing a connection structure in the case where a personal computer having a USB host function is connected to the mobile communication terminal shown in FIG. 1 as the external device.

An operation of the mobile communication terminal which is constituted in the manner described above is explained by using the flowchart shown in FIG. 3.

Incidentally, here an explanation will be made on a case in which a personal computer PC having a USB host function is connected to the mobile communication terminal MS and a case in which a memory card having no USB host function is connected to the PC respectively.

(1) In the Case where the Personal Computer PC is Connected to the Mobile Communication Terminal Suppose that a personal computer PC is connected to a mobile communication terminal device MC via a USB cable 7 in the state in which the powers source is turned on. Then, at step S4a, the personal computer PC generates the USB power source voltage (4.75 to 5.25V) with the voltage generator 62. This USB power source voltage is supplied to the mobile communication terminal MS via the USB cable 7 and the USB power source pin P4 (VBUS) to be input to the detection circuit 22 in the USB interface 2. When the detection circuit 22 detects the input of the power source voltage, an interruption signal is given to the host CPU 1.

After the host CPU 1 of mobile communication terminal MS conducts initialization at step 3a, the host CPU 1 monitors the input of the interruption signal at step 3b. Then, when the interruption signal is input from the detection circuit 22 in this state, the host CPU 1 determines that the external device is connected to the system connector 5, so that the voltage detection value is input from the detection circuit 22 at step 3c. Then, the CPU 1 determines whether or not the external device has a USB host function on the basis of the voltage detection value at step 3d.

For example, when the voltage detection value is the USB power source voltage (4.75 to 5.25V), it is determined that the external device which is connected is a device which has a USB host function. In contrast, the voltage detection value is a voltage other than the USB power source voltage (4.75 to 5.25V), it is determined that the external device which is connected is a device which does not have a USB host function.

By the way, when the type of the external interface incorporated in the external device is determined, the host CPU 1 conducts the change-over control of the switching circuit 4 at step 3e on the basis of the determination result thereof. For example, now, the personal computer PC having the USB host function is connected as an external device. Consequently, the host CPU 1 changes over the first change-over switch 41 to the side of the USB device controller 21. Furthermore, at the same time, the CPU 1 turns off the second change-over switch 42 to set the serial data interface 11 to the no-connection state with respect to the manufacturer's option pin P8 and the reservation pin P9 of the system connector 5.

Subsequently, the host CPU 1 moves to step 3f to create the ID request command here to send this ID request command to the personal computer PC via the USB device controller 21. The personal computer PC monitors the arrival of the ID request command at step 4b as shown in FIG. 3. In this state, when the ID request command comes from the mobile communication terminal MS, the device ID indicating the type of the device itself and the manufacturer ID are generated to send the device ID and the manufacturer ID to the mobile communication terminal MS.

The host CPU 1 of the mobile communication terminal MS monitors the arrival of the ID at step 3g after sending the ID request command. When the device ID and the manufacturer ID are received in this state, the external device database not shown is accessed on the basis of the device ID and the manufacturer ID at step 3h to determine the type and the specification of the external device. Then, on the basis of the determination result, at step 3i, the external device determines whether or not the external device can be connected to the mobile communication terminal MS itself. Then, in the case where the external device can be connected thereto, the connection port between the system connector 5 and the main body of the terminal is set to the effective state.

Thus, the mobile communication terminal MS and the personal computer PC are connected via the USB interface, so that data transmission control by the upper protocol is made possible between the two devices.

(2) When the Memory Card ES is Connected to the Mobile Communication Terminal

Suppose that the memory card ES is connected to the mobile communication terminal MS via the cable 9 corresponding to the system connector as shown in FIG. 5. Then, at step 4a, the memory card ES generates a power source voltage (3V) which is set to be different from the USB power source voltage (4.75 to 5.25V) with a voltage generator 82 provided for generating an interface identification voltage.

The interface identification voltage is supplied to the mobile communication terminal MS via the cable 9 and the USB power source pin P4 (VBUS) to be input to the detection circuit 22 in the USB interface 2. When the detection circuit 22 detects the input of the interface identification voltage, the interruption signal is given to the host CPU 1.

When the CPU 1 of the mobile communication terminal MS detects the generation of the interruption at step 3b, it is determined that the external device is connected to the system connector 5. Then, after the voltage detection value is detected from the detection circuit 22, it is determined whether or not the external device has a USB host function at step 3d on the basis of the voltage detection value. Now, since the voltage is set to a value (2V) other than the USB power source voltage (4.75 to 5.25V), the external device which is connected is a device that does not have a USB host function.

Then, when the type of the external interface incorporated in the external device is determined, the host CPU 1 conducts the change-over control of the switching circuit 4 at step 3e on the basis of the determination result thereof. For example, now a memory card ES having no USB host function is connected as the external device. As a consequence, the host CPU 1 is changed over the first change-over switch 41 to the side of the serial control signal interface 3. Furthermore, at the same time, the second change-over switch 42 is turned on to connect the serial data interface 11 to the manufacturer's option pin P8 and the reservation pin P9 of the system connector 5.

Subsequently, the host CPU 1 moves to step 3f to create the ID request command here. Then, this ID request command is sent to the memory card ES via the serial control signal interface 3. The memory card ES monitors the arrival of the ID request command at step 4b as shown in FIG. 3. When the ID request command arrives from the mobile communication terminal device MS in this state, the device ID and the manufacturer ID are created at step 4c, the device ID and the manufacturer ID are sent to the mobile communication terminal MS.

The host CPU 1 of the mobile communication terminal MS monitors the arrival of the ID at step 3g after sending the above ID request command. When the device ID and the manufacturer ID are received in this state, the external device database not shown is accessed on the basis of the device ID and the manufacturer ID at step 3h to determine the type and the specification of the external device. Then, on the determination result, it is determined at step 3i whether or not the external device can be connected to the terminal of the mobile communication terminal MS itself. Then, in the case where it is determined that the external device can be connected thereto, the connection port between the system connector 5 and the main body of the terminal is set to the effective state.

Thus, the mobile communication terminal MS and the memory card ED are connected via the serial control signal interfaces 3 and 81 and the serial data interfaces 11 and 83. Then, the serial data can be transmitted by the upper protocol between the two devices.

In contrast, in the case where it is determined on the basis of the determination result of the type of the external device and the specification thereof that the external device cannot be connected to the communication terminal MS, the connection port between the system connector 5 and the main body of the terminal is set to the cut-off state. Consequently, in the case where the external device which does not conform to the specification of the mobile communication terminal MS is connected thereto, the connection of the external device is cut off so that an unfavorable influence of the external device to the mobile communication terminal MS is prevented in advance.

As has been described above, in this embodiment, the serial control signal interface 3 and the serial data interface 11 are provided in addition to the USB interface 2 having the USB device controller 21 in the mobile communication terminal MS while a switching circuit 4 is provided for selectively connecting these interfaces to the system connector 5. Then, when the external device is connected to the system connector 5, it is determined whether or not the external device has an external interface having the USB host function on the basis of the interface identification voltage supplied from the external device to change over and control the switching circuit 4 on the basis of the determination result and select an appropriate external interface.

Consequently, the USB interface 2 is selected and data is transmitted using the USB interface in the case where the external device which is connected is a personal computer having the USB host function while the serial control signal interface 3 and the serial data interface 11 are selected to transmit data using a universal serial interface in the case where the external device is a slave device such as a memory card ES or the like having no USB host function.

That is, even when the mobile communication terminal has no USB host function, data can be transmitted by selectively connecting a plurality of types of external devices having different external interface so that the mobile communication terminal MS can be maintained at a low power consumption and a low cost.

Besides, in this embodiment, the USB interface and the serial interface are selectively connected with respect to one serial connector 5. That is, one serial connector 5 is shared with the USB interface and the serial interface. As a consequence, it is not necessary to newly provide a serial interface connector so that an increase in the size of the mobile communication terminal can be prevented.

Furthermore, in this embodiment, the device type of the external device and the name of the manufacturer thereof, namely, the specification thereof is determined by conducting authentication procedure between the external device which is connected and the mobile communication terminal to determine whether or not the external device can be connected to the terminal of the mobile communication terminal itself. Then, it is determined that the external device cannot be connected thereto, the external device is set to the non-connection state. Consequently, even when the external device having different specification is connected, a disadvantage can be prevented in advance in that the mobile communication terminal causes an error in operation or trouble in some cases with the external device.

This effect is particularly effective in the case where a charger is connected thereto as the external device. That is, when the rated value of the voltage/current of the connected charger is different from the standard value of the mobile communication terminal, it sometimes happen that the device is heated or catches fire which is extremely unfavorable. Then, in this embodiment, when the charger as the external device is connected, the device ID and the manufacturer ID of the charger obtained in the authentication procedure are determined so that the charger can not be connected, the charging power source input pins P5 and P6 and the power source circuit in the portable communication terminal are cut off to prevent the charging thereof. Consequently, even when a charger having a different standard is connected, heating and fire can be prevented with certitude.

Incidentally, the present invention is not limited thereto. For example, the present embodiment has a USB interface having a USB slave function and a universal serial interface to constitute a structure in which the external interface is selected in accordance with the type of the external interface incorporated in the external device which is connected. However, the present invention may not necessarily limited thereto. The present invention may comprise a plurality of types of external interfaces such as RS232C, SPI, I3BUS, IEEE1394 to select these external interfaces in accordance with the types of the external interface incorporated in the external device.

Furthermore, in the above embodiment, there has been explained a case in which an USB interface having the USB slave function is provided on the mobile communication terminal MS. However, the invention may be constituted in such a manner that a simple host function of USB which is constituted so that processing addition becomes smaller than the USB host function provided on the external device having a high processing capability or the like such as, for example, a personal computer or the like.

With such a structure, it becomes possible to transmit data using the USB interface between the terminal of the mobile communication terminal and a majority of external devices having only USB slave function without increasing a memory capacity of the mobile communication terminal MS and a processing capability of the CPU.

Furthermore, in the above embodiment, there has been explained a case in which the type of the external interface incorporated in the external device is determined on the basis of the interface identification voltage generated by the external device. However, the invention may be constituted in such a manner that the type of the external interface is determined by supplying one bit or two bits identification signal instead of the interface identification voltage so that the type of the external interface is determined by supplying the identification signal to a specific connector pin of the mobile communication terminal from the external device.

Apart from it, with respect to the structure of the first and the second determination means and the determination content, the structure of the interface selection means, the structure of the connection control means, the type of the external device, the type of the external interface and the like can be modified in various ways without departing from the gist of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal device comprising:
   a first Universal Serial Bus (USB) interface having a USB slave function;
   a serial data interface different form the first USB interface;
   a system connector comprising a plurality of terminals, being connectable to an external device by said plurality of terminals;
   first determination means for determining whether or not the external device connected to the system connector comprises a second USB interface having a USB host function;
   interface selection means for selecting the first USB interface when it is determined by the first determination means that the external device comprises the second USB interface having the USB host function, and for selecting the serial data interface when it is determined by the first determination means that the external device does not comprise the second USB interface having the USB host function; and
   switching means for connecting the terminals of the system connector with the first USB interface when the first USB interface is selected by the interface selection means, and for connecting the terminals of the system connector with another serial data interface when the serial data interface is selected by the interface selection means, wherein
   the first USB interface performs a data transfer with the external device via the terminals of the system connector when the first USB interface is selected by the interface selection means and the first USB interface is connected to the terminals of the system connector, and
   the serial data interface performs data transfer with the external device via the terminals of the connector system when the serial data interface is selected by the interface selection means and said another serial data interface is connected to the terminals of the system connector by the switching means.

2. The mobile communication terminal device according to claim 1, wherein
   the first determination means comprises:
   means for detecting a voltage value output from a specific terminal via the system connector when the external device is connected to the system connector; and means for determining a kind of third external interface incorporated the external device based on the detection result by the voltage value detection means.

3. The mobile communication terminal device according to claim 1, wherein the first determination means comprises:

means for detecting identification signal pattern output form a specific terminal via the system connector in the case where the external device is connected to the system connector; and means for determining a type of third external interface incorporated in the external device based on the detection result of the signal pattern detection means.

4. The mobile communication terminal device according to claim 1, further comprising:

authentication means for conducting authentication procedure between the external device and the mobile communication terminal device via the system connector;

second determination means for determining a connection form between the mobile communication terminal device and the external device based on the authentication result by the authentication means; and connection control means for controlling the connection of the external device to the mobile communication terminal device itself on the basis of the determination result of the second determination means.

5. The mobile communication terminal device according to claim 4, wherein the authentication means determines whether or not the external device is a battery charger;

the second determination means, in the case where the authentication means determines that the external device is a battery charger, detects a standard value of the battery charger to determine whether or not the battery charger can be connected; and the connection control means connects the battery charger and a power source circuit in the mobile communication terminal device in the case where the second determination means determines that the battery charger can be connected, while cut off the battery charger from the power source circuit in the case where the second determination means determines that the battery charger cannot be connected.

6. A mobile communication terminal device comprising:

a system connector having a predetermined terminal arrangement structure;

a first external interface sending and receiving a first signal in accordance with a first protocol via the system connector between the mobile communication terminal device itself and an external device;

a second external interface sending and receiving a second signal in accordance with a second protocol being different from the first protocol via the system connector between the mobile communication terminal device itself and the external device;

first determination means for determining a third external interface provided on the external device individually from the first and second external interfaces to be connected to the system connector; and interface selection means for selecting an external interface corresponding to the third external interface from the first and second external interfaces based on a determination result of the first determination means.

7. The mobile communication terminal device according to claim 6, wherein a part of terminals of the system connector is shared with the first external interface and the second external interface.

8. The mobile communication terminal device according to claim 6, wherein the first determination means detects a voltage value output from a specific terminal via the system connector when the external device is connected to the system connector to determine the third interface incorporated in the external devices.

9. The mobile communication terminal device according to claim 6, wherein the first determination means detects an identification signal pattern output from a specific terminal via the system connector when the external device is connected to the system connector to determine the third interface incorporated in the external device.

10. The mobile communication terminal device according to claim 6, further comprising first display displaying a determination result by the first determination means.

11. The mobile communication terminal device according to claim 6, further comprising:

authentication means for conducting a authentication procedure between the mobile communication terminal device and the external device via an external interface selected from first and second external interfaces;

second determination means for determining a connection form between the mobile communication terminal device itself and the external device based on an authentication result of the authentication means; and connection control means for controlling a connection of the external device to the mobile communication terminal device itself based on a determination result of the second determination means.

12. The mobile communication terminal device according to claim 11, wherein the second determination means detects a specification of the external device and determines whether or not the external device can be connected to the mobile communication terminal device itself.

13. The mobile communication terminal device according to claim 11, further comprising a second display displaying the determination result by the second determination means.

14. A mobile communication terminal device comprising:

a system connector having a USB (Universal Serial Bus) terminal and additional terminal;

a first external interface sending and receiving a first signal in accordance with a first protocol via the system connector between the mobile communication terminal device itself and an external device;

a second external interface sending and receiving a second signal in accordance with a second protocol being different from the first protocol via the system connector between the mobile communication terminal device itself and the external device;

first determination means for determining a third external interface provided on the external device individually from the first and second external interfaces to be connected to the system connector; and interface selection means for selecting an external interface corresponding to the third external interface from the first and second external interfaces based on a determination result of the first determination means, wherein the first external interface transmits the first signal between the external device and the mobile communication terminal device via the USB terminal of the system connector in the case where the first external interface is selected, while the second external interface selectively uses a part of the USB terminal of the system connector and the additional terminal to transmit the second signal between the external device and the mobile communication terminal device in the case where the second external interface is selected.

15. The mobile communication terminal device according to claim 14, wherein a part of terminals of the system connector is shared with the first external interface and the second external interface.

16. The mobile communication terminal device according to claim 14, wherein
the first determination means detects a voltage value output from a specific terminal via the system connector when the external device is connected to the system connector to determine the third interface incorporated in the external devices.

17. The mobile communication terminal device according to claim 14, wherein
the first determination means detects an identification signal pattern output from a specific terminal via the system connector when the external device is connected to the system connector to determine the third interface incorporated in the external device.

18. The mobile communication terminal device according to claim 14, further comprising first display displaying a determination result by the first determination means.

19. The mobile communication terminal device according to claim 14, further comprising:
authentication means for conducting a authentication procedure between the mobile communication terminal device and the external device via an external interface selected from first and second external interfaces;
second determination means for determining a connection form between the mobile communication terminal device itself and the external device based on an authentication result of the authentication means; and
connection control means for controlling a connection of the external device to the mobile communication terminal device itself based on a determination result of the second determination means.

20. The mobile communication terminal device according to claim 19, wherein the second determination means detects a specification of the external device and determines whether or not the external device can be connected to the mobile communication terminal device itself.

21. The mobile communication terminal device according to claim 19, further comprising a second display displaying the determination result by the second determination means.

22. A mobile communication terminal device comprising:
a system connector comprising a USB (Universal Serial Bus) terminal and an additional terminal;
a first external interface providing a USB slave function;
a second external interface which is different from the first external interface concerning a protocol;
first determination means for determining whether or not an external device connected to the system connector comprises a third external interface providing a USB host function; and
interface selection means for selecting the first external interface when it is determined that the external device provides the USB host function while selecting the second external interface when it is determined that the external device does not provide the USB host function based on a determination result of the first determination means.

23. The mobile communication terminal device according to claim 22, wherein the first determination means comprises:
means for detecting a voltage value output from a specific terminal via the system connector when the external device is connected to the system connector; and
means for determining a kind of third external interface incorporated in the external device based on the detection result by the voltage value detection means.

24. The mobile communication terminal device according to claim 22, wherein the first determination means comprises:
means for detecting identification signal pattern output form a specific terminal via the system connector in the case where the external device is connected to the system connector; and
means for determining type of third external interface incorporated in the external device based on the detection result of the signal pattern detection means.

25. The mobile communication terminal device according to claim 22, further comprising:
authentication means for conducting authentication procedure between the external device and the mobile communication terminal device via the system connector;
second determination means for determining a connection form between the mobile communication terminal device and the external device based on the authentication result by the authentication means; and
connection control means for controlling the connection of the external device to the mobile communication terminal device itself on the basis of the determination result of the second determination means.

26. The mobile communication terminal device according to claim 25, wherein the authentication means determines whether or not the external device is a battery charger;
the second determination means, in the case where the authentication means determines that the external device is a battery charger, detects a standard value of the battery charger to determine whether or not the battery charger can be connected; and
the connection control means connects the battery charger and a power source circuit in the mobile communication terminal device in the case where the second determination means determines that the battery charger can be connected, while cut off the battery charger from the power source circuit in the case where the second determination means determines that the battery charger cannot be connected.

* * * * *

UNITED STATES PATENT AND TRADEMARK OFFICE
CERTIFICATE OF CORRECTION

PATENT NO. : 6,836,814 B2
DATED : December 28, 2004
INVENTOR(S) : Takaoka et al.

It is certified that error appears in the above-identified patent and that said Letters Patent is hereby corrected as shown below:

Title page,
Item [57], ABSTRACT,
Line 4, change "these interface" to -- these interfaces --.

Column 11,
Line 2, change "incorporated the" to -- incorporated in the --.
Line 8, change "form" to -- from --.

Column 12,
Line 22, change "a authentication" to -- an authentication --.

Column 13,
Line 30, change "a authentication" to -- an authentication --.

Column 14,
Line 22, change "form" to -- from --.

Signed and Sealed this

Twelfth Day of April, 2005

JON W. DUDAS
*Director of the United States Patent and Trademark Office*